(12) United States Patent
Erforth et al.

(10) Patent No.: US 8,621,193 B2
(45) Date of Patent: Dec. 31, 2013

(54) BOOTING A COMPUTER SYSTEM AT START-UP BY TRANSFERRING A FIRST PART OF INSTRUCTIONS USING A SECOND BUS AND TRANSFERRING A SECOND PART OF INSTRUCTIONS USING A FIRST BUS WHERE THE SECOND BUS IS CONFIGURED TO TRANSFER INSTRUCTIONS AT A FASTER RATE THAN THE FIRST BUS

(75) Inventors: Thomas Erforth, Karlsruhe (DE); Peter Kies, Karlsruhe (DE); Bruno Achauer, Zaberfeld (DE); Arno Kutzki, Straubenhardt (DE); Günther Kraft, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 307 days.

(21) Appl. No.: 12/722,468

(22) Filed: Mar. 11, 2010

(65) Prior Publication Data

US 2010/0235618 A1 Sep. 16, 2010

(30) Foreign Application Priority Data

Mar. 11, 2009 (EP) .................................... 09003545

(51) Int. Cl.
*G06F 13/00* (2006.01)
*G06F 9/00* (2006.01)
*G06F 1/00* (2006.01)
*G06F 13/14* (2006.01)

(52) U.S. Cl.
USPC .................. 713/2; 711/154; 713/1; 713/300; 710/305; 710/314

(58) Field of Classification Search
USPC ....... 711/154; 717/176; 713/1, 300, 2; 714/5; 455/513; 710/314, 305; 726/27
See application file for complete search history.

(56) References Cited

U.S. PATENT DOCUMENTS 5,606,293 A 2/1997 Matsui et al.
6,058,474 A 5/2000 Baltz et al.
(Continued)

FOREIGN PATENT DOCUMENTS

EP 1387284 A2 2/2004
EP 1460539 A2 9/2004
GB 2304209 A 3/1997

OTHER PUBLICATIONS

Apple II Reference Manual; Jan. 1978; Cupertino, CA.
(Continued)

*Primary Examiner* — Thomas Lee
*Assistant Examiner* — Aurel Prifti
(74) *Attorney, Agent, or Firm* — O'Shea Getz P.C.

(57) ABSTRACT

A computing device is provided that includes a computing unit, which has a working memory and a processing unit, and a boot memory having control instructions for operating the computing device. The control instructions are stored in boot memory and are to be transferred to the computing unit at start-up of the computing device. A boot control unit is connected to the computing unit by at least a first and a second interface and connected to the boot memory by a third interface. The boot control unit is configured to transfer a first part of the control instructions from the boot memory via the first interface to the computing unit and to transfer a second part of the control instructions from the boot memory via the second interface to the computing unit.

12 Claims, 4 Drawing Sheets

(56) References Cited

U.S. PATENT DOCUMENTS

| | | | |
|---|---|---|---|
| 6,396,353 | B1 | 5/2002 | Krobel et al. |
| 6,560,685 | B1 | 5/2003 | Jackson |
| 6,754,759 | B1* | 6/2004 | Cook et al. .................. 710/305 |
| 7,076,646 | B2* | 7/2006 | Chang ............................ 713/1 |
| 8,356,168 | B2* | 1/2013 | Zimmer et al. ................. 713/2 |
| 2001/0034821 | A1 | 10/2001 | Hwang |
| 2002/0138669 | A1 | 9/2002 | Kadatch et al. |
| 2005/0005076 | A1* | 1/2005 | Lasser ............................ 711/154 |
| 2006/0085629 | A1* | 4/2006 | Swanson et al. ................ 713/1 |
| 2006/0174100 | A1* | 8/2006 | Park .................................. 713/2 |
| 2006/0245274 | A1 | 11/2006 | Choi et al. |
| 2007/0101168 | A1* | 5/2007 | Atkinson ....................... 713/300 |
| 2007/0174835 | A1* | 7/2007 | Xu et al. ........................ 717/176 |
| 2007/0180223 | A1* | 8/2007 | Tanaka ............................ 713/2 |
| 2007/0204143 | A1* | 8/2007 | Liao et al. ........................ 713/2 |
| 2008/0098257 | A1* | 4/2008 | Blinick et al. .................... 714/5 |
| 2008/0141016 | A1* | 6/2008 | Chang et al. ..................... 713/2 |
| 2008/0263349 | A1* | 10/2008 | Ota et al. ......................... 713/2 |
| 2008/0279098 | A1 | 11/2008 | Park |
| 2008/0301427 | A1* | 12/2008 | Zhao ................................. 713/2 |
| 2009/0006708 | A1* | 1/2009 | Lim ............................... 710/314 |
| 2009/0254995 | A1* | 10/2009 | John et al. ...................... 726/27 |
| 2011/0111785 | A1* | 5/2011 | Lindoff et al. ................. 455/513 |
| 2011/0225404 | A1* | 9/2011 | Thill et al. ....................... 713/2 |

OTHER PUBLICATIONS

Addendum to Apple II Reference Manual; Jan. 1978; Cupertino, CA.

* cited by examiner

BOOTING A COMPUTER SYSTEM AT START-UP BY TRANSFERRING A FIRST PART OF INSTRUCTIONS USING A SECOND BUS AND TRANSFERRING A SECOND PART OF INSTRUCTIONS USING A FIRST BUS WHERE THE SECOND BUS IS CONFIGURED TO TRANSFER INSTRUCTIONS AT A FASTER RATE THAN THE FIRST BUS

RELATED APPLICATIONS

This application claims priority of European Patent Application Serial Number 09 003 545.2, filed on Mar. 11, 2009, titled COMPUTING DEVICE AND START-UP METHOD THEREFORE, which application is incorporated in its entirety by reference in this application.

BACKGROUND

1. Field of the Invention

The present invention relates to a computing device, and more particularly, to a computing device with an improved start-up performance.

2. Related Art

Computer platforms are implemented in a range of electronic devices, such as portable electronic devices including portable computers, mobile interne devices, smart phones and the like. Computing platforms are also being implemented in vehicles to control a range of vehicle functions. Applications, such as vehicles and other devices that use computing platforms, may use as a computing platform, for example, the Intel® Centrino® Atom™ platform using an Intel® Atom™ processor, which is also termed Menlow or Menlow XL platform.

Applications typically require that the computing platform start up and operate quickly to minimize the delay before the applications can be used. Automotive applications require particularly fast start-up times to make the vehicle functions controlled by the computing device available as soon as the vehicle is started. For example, the warning sound for reversing the vehicle should become available immediately after starting the vehicle. Further, there may be special requirements regarding early audio and early video, for example.

When a computing device is started up, a reset signal is generally applied to the central processing unit. When a synchronous reset is used, as is used in the Intel® Centrino® platform, the reset signal requires a clock signal for recognition and processing by the CPU. The clock signal is typically generated by a real-time clock (RTC), which may use, for example, a 32 kHz quartz oscillator. Such quartz oscillators may have an oscillation build-up time of 800 ms or more. The CPU cannot process the reset signal before this build-up time elapses. Therefore, the reset signal is held and is not deactivated until the build-up time elapses. If the reset signal is deactivated before a valid RTC clock signal is available to the computing device, the computing device may exhibit undefined or erratic behavior. To ensure that the RTC clock signal is not deactivated too soon, an additional delay is introduced in the start-up phase of the computing device. The added delay and the delay caused by the initial program load (IPL) and the start-up application via the relatively slow low pin count (LPC) bus may result in a delay at start-up of such a conventional computing device that can no longer meet the requirements of automotive environments.

A computing system based on such a platform generally requires about two seconds for starting up and loads a system application having a size of about two megabytes (MB) during the booting procedure (IPL). A delay of such length before the computing device becomes operable is generally too long for automotive applications.

Accordingly, there is a need for improving the start-up performance of a computing device. In particular, it is desirable to reduce the time required by the computing device to become operational.

SUMMARY

In view of the above, a computing device is provided. The computing device includes a computing unit, which has a working memory and a processing unit. A boot memory is included, the boot memory having control instructions for operating the computing device. The control instructions are stored in boot memory and are to be transferred to the computing unit at start-up of the computing device. A boot control unit is connected to the computing unit by at least a first and a second interface and connected to the boot memory by a third interface. The boot control unit is configured to transfer a first part of the control instructions from the boot memory via the first interface to the computing unit and to transfer a second part of the control instructions from the boot memory via the second interface to the computing unit.

It is to be understood that the features mentioned above and those yet to be explained below can be used not only in the respective combinations indicated, but also in other combinations or in isolation without departing from the scope of the invention.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The description below may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
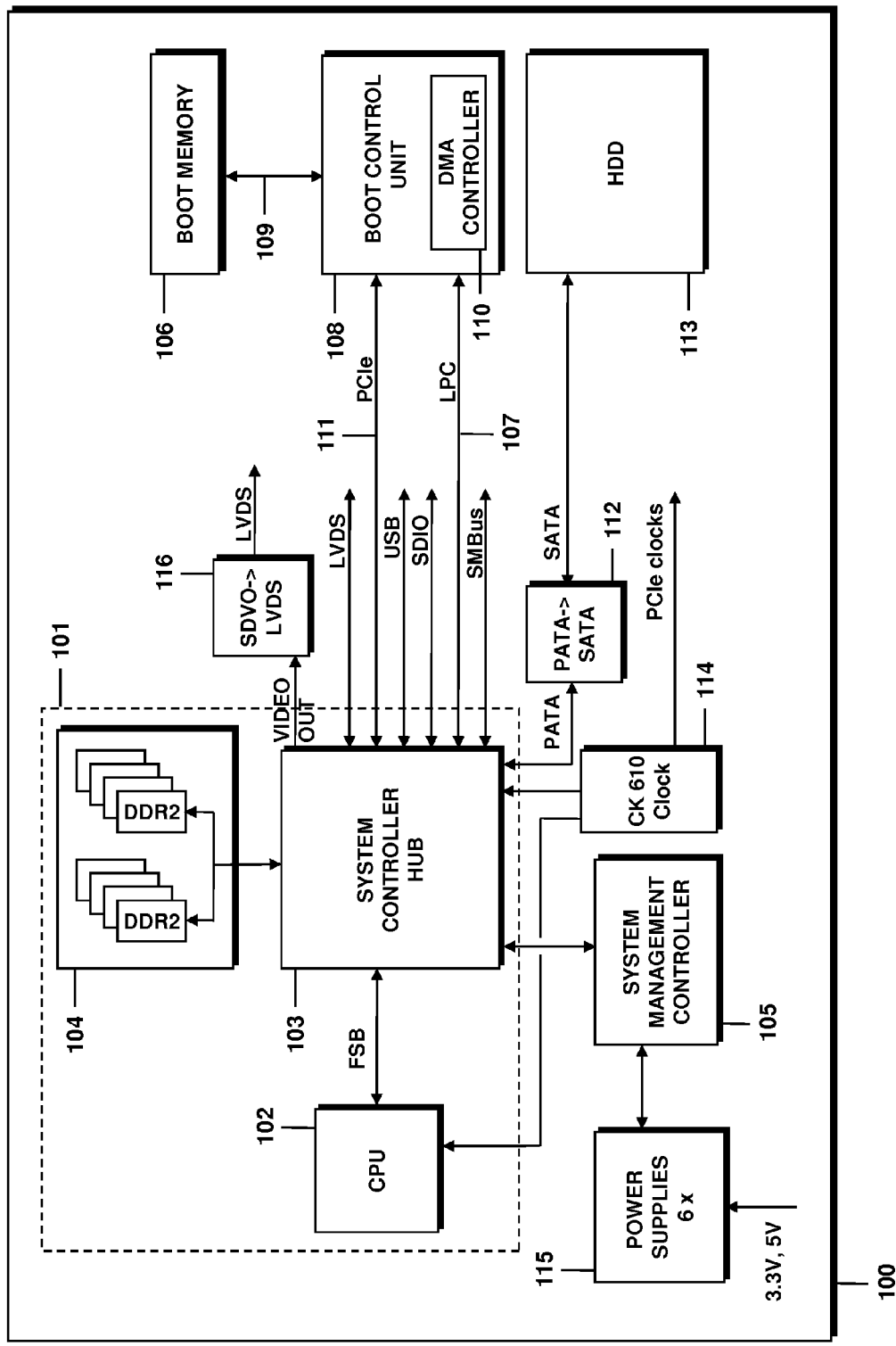
FIG. 1 is a schematic diagram of an example computing device.

It is to be understood that the following description of example implementations is given only for the purpose of illustration and is not to be taken in a limiting sense. The partitioning of examples in function blocks or units shown in the drawings is not to be construed as indicating that these units are necessarily implemented as physically separate units. Functional blocks or units shown or described may be implemented as separate units, circuits, chips or circuit elements. One or more functional blocks or units may also be implemented in a common circuit, chip, circuit element or unit.

FIG. 1 is a schematic diagram of an example computing device 100. The computing device 100 in FIG. 1 includes a computing unit 101, which includes a central processing unit 102, a system controller hub 103 and a working memory 104. In the example of FIG. 1, the computing device 100 is implemented using an Intel® Centrino® Atom™ platform, which may include a Menlow or Menlow XL platform. The system controller hub (SCH) 103 may be a Poulsbo or Poulsbo XL controller hub. CPU 102 is an Intel® Atom™ processor. Other platforms using different processors and system controllers may also be used in examples of implementations. The working memory 104 may be implemented using a plurality of double data rate 2 (DDR2) random access memory (RAM) modules, although other types of memory devices may also be used.

The computing device 100 also includes a system management controller (SMC) 105, which may provide control functions such as control of power flow and fan speed. In an example implementation, the SMC 105 may also include functions that signal a reset event to the computing unit 101. A reset signal may for example be signalled to the SCH 103 and other components of the platform that receive a reset signal. The SMC 105 may include a clock 114 and a power supply 115, and may be implemented in one combined chip sub-system.

The start-up of the computing device 100 includes a first start-up phase, which is generally controlled by hardware. In the first start-up phase, the reset signal is recognized. The reset signal is controlled by the availability of a valid clock signal for the synchronous reset interface. The reset signal cannot be processed by computing unit 101 until a valid clock signal is available. In general, a real-time clock quartz is used to generate a clock signal at a frequency of 32.8 kHz, for example. Such RTC quartz clocks are susceptible to an oscillation build-up time of more than 800 ms. Such high oscillation build-up times may be encountered more frequently in automotive environments, where batteries may not be used to power the RTC quartz.

In the example illustrated in FIG. 1, a clock signal is generated by the SMC 105, which may include a quartz oscillator, or may connect to an oscillator external to the SMC 105 (not shown in FIG. 1). The quartz oscillator connected to the SMC 105 may operate at a higher frequency than the RTC quartz. For example, the quartz oscillator in the SMC 105 may operate in the MHz range. The oscillation build-up time of the oscillator connected to the SMC 105 may therefore be shorter than that of a RTC quartz. For example, the oscillation build-up time may be as short as 10 to 20 ms. The system management controller 105 may include one or more frequency dividers to reduce the frequency of the clock signal. The SCH 103 may still require a clock signal with a frequency of 32.768 kHz, which is the frequency generally produced by the crystal oscillator of a RTC. The SMC 105 may divide and/or multiply the frequency of the clock signal to generate the frequency required by the SCH 103.

The clock signal provided by the SMC 105 to the SCH 103 may be available much earlier than the clock signal of a conventional RTC. Therefore, the SCH 103 may start processing the reset signal much earlier, and the time span to the deactivation of the reset signal can be significantly reduced. The SCH 103 provides both the reset signal and the clock signal to the CPU 102 at start-up. During the operation of the computing device 100, the SMC 105 continues to supply the clock signal to the SCH 103.

In the example illustrated in FIG. 1, the SMC 105 generates the clock signal as well as the reset signal. After the start-up phase, further initialization of the computing device 100 may be performed according to any known method, which may include continuing by initializing memory 104, and performing other desired initialization tasks.

The start-up of the computing device 100 may include loading control instructions such as, for example, boot code or a boot application, into the computing unit 101. The control instructions for boot code or boot applications may be stored in boot memory 106, which may be implemented as a flash memory or any other suitable non-volatile writable memory. The loading of the boot code during the start-up of the computing device 100 may also be termed "initial program load" (IPL).

The computing device 100 includes a boot control unit 108 connected to the computing unit 101 by at least a first and a second interface. The boot control unit 108 is connected to the boot memory 106 by a third interface. The boot control unit 108 is configured to transfer a first part of the control instructions from the boot memory 106 via the first interface to the computing unit 101 and to transfer a second part of the control instructions from the boot memory 106 via the second interface to the computing unit 101. In the example in FIG. 1, the first interface may be the low pin count (LPC) bus 107. The second interface may be a high-speed data interconnect, which may be implemented as a peripheral component interconnect express (PCIe) bus 111. The third interface between the boot memory and the boot control unit may be a parallel bus 109, which may be an eight-bit parallel bus. Only a smaller part of the control instructions is transferred via the relatively slow LPC bus 107. The larger part of the control instructions is transferred via the fast PCIe bus 111, which may result in significant improvements in the performance of the initial program load.

In the example shown in FIG. 1, the boot control unit 108 connects the boot memory 106 via a parallel interface 109, which may be for example an 8-bit interface. The boot control unit 108 may be a field-programmable gate array (FPGA) or an application-specific integrated circuit (ASIC). Both of these types of components may be configured for performing specified functions efficiently and at high speeds. The boot control unit 108 may for example be configured to include a direct memory access (DMA) controller 110. The boot control unit 108 connects to the SCH 103 via the LPC interface 107 and a high-speed data interconnect (or bus) 111. The high-speed data interconnect 111 may be any data interface that provides a data transfer rate that is higher than that of the LPC bus 107. In the description of example implementations below, the PCIe interface is used interchangeably with high-speed data interconnect. Those of ordinary skill in the art will understand that the high-speed data interconnect is not limited to implementation using the PCIe interface. Any suitable high-speed data interconnect may be used.

The boot control unit 108 accesses the boot memory 106 and transfers a first part of the control instructions stored in boot memory 106 over the LPC bus 107 to the SCH 103. The transferred control instructions are executed to initialize the high-speed data interconnect 111. During the initial boot in an example implementation, about 100-300 kB of boot code may be transferred to the SCH 103. After the initial boot, the boot control unit 108 switches to transferring data over the high-speed data interconnect 111 to transfer data at the higher bandwidth offered by the high-speed data interconnect 111. The connection between the boot memory 106, the boot control unit 108 and the SCH 103, which includes the parallel interface 109 and the high-speed data interconnect 111, enables the transfer of the remaining part of the boot code to proceed at a higher rate than is possible using a standard LPC bus. For example, a boot code that is about 2 MB in size may be transferred at about 900 ms faster using the PCIe interface 111 as described above than by loading the data directly from the boot flash via a LPC bus. The second part of the control instructions may be directly transferred into the working memory 104 by the DMA controller 110. In an example implementation, the DMA controller 110 may operate via a Southbridge or the system controller hub 103 of the computing unit 101. The transfer may be performed fast and efficiently using the DMA controller 110 without the need to involve the processing unit 102. The boot data may also be loaded from other DMA-capable mass storage devices, such as a hard drive, a SD card or other types of memory cards, which may have latencies on the order of several hundreds of milliseconds. The computing device 100 shown in FIG. 1 may still achieve transfer rates of about 300 ms faster using the PCIe interface 111 as described above than by loading the boot data from the boot flash 106 using the LPC bus.

As described above, the boot control unit 108 may be implemented using an ASIC or a FPGA. A FPGA typically requires its own time for initialization. Using an ASIC may result in loading times that are about 150-300 ms shorter.

At least some of the control instructions may be provided as a compressed boot image in boot memory 106. During the DMA-transfer of the boot image over the high-speed data interconnect 111, the boot image data may be decompressed. The decompression of the boot image data may be performed relatively fast making the corresponding data available in a decompressed format shortly after the boot image is transferred to memory 104.

The computing device 100 provides the RTC clock signal used for the reset by the system management controller 105 and transfers the boot application via both LPC bus 107 and PCIe bus 111 allowing for an improvement in start-up performance of about 500-1000 ms or even more. In the example described with reference to FIG. 1, the time required for starting up computing device 100 may be cut in half, which allows for the computing device 100 to operate under the stringent requirements for computing devices used in automotive applications.

It is noted that in other examples, the SCH 103 may receive the clock signal from a standard RTC clock, while the control instructions used for booting the computing device 100 are transferred as described above with reference to FIG. 1. In still other examples, a standard boot procedure may be implemented, such as for example, by transferring the boot application from the boot memory using the LPC bus, while the clock signal is provided by the SMC 105 as described above. Such examples may also result in improved start-up performance compared to conventional computing devices.

The computing device 100 may include other components that are common to conventional computing devices. Such components are known to those of ordinary skill in the art and need not be described in greater detail. Examples of such components include a serial advanced technology attachment (SATA) interface 112, a connected hard disk drive (HDD) 113, a clock 114 for generating further clock signals, and a power supply 115. The clock 114 may for example be used to provide a clock signal to the CPU 102 and to the high-speed data interconnect 111 components. The clock 114 provides a clock signal that is different from the clock signal required for processing the reset signal at the start-up of the computing device 100. The clock signal supplied by the SMC 105 and used when processing the reset signal may also be provided throughout the operation of computing device 100.

In the computing device 100 in FIG. 1, a converter 116 converts a serial digital video out (SDVO) signal received from the SCH 103 to a low voltage differential signal (LVDS). The LVDS signal may be connected to a display. It is to be understood that some of the components shown in FIG. 1, such as units 112-116 as well as the LVDS, USB, SDIO and SM interfaces are optional.

The computing device 100 may be implemented as a control unit in a vehicle. The computing device 100 may for example control light, sound or engine-related functions of the vehicle. The computing device 100 may also be implemented in other devices, such as portable computing devices including a portable computer, a smart phone, a mobile internet device, a personal digital assistance and the like. Other implementations will suggest themselves to those of ordinary skill in the art.

Figure 2:
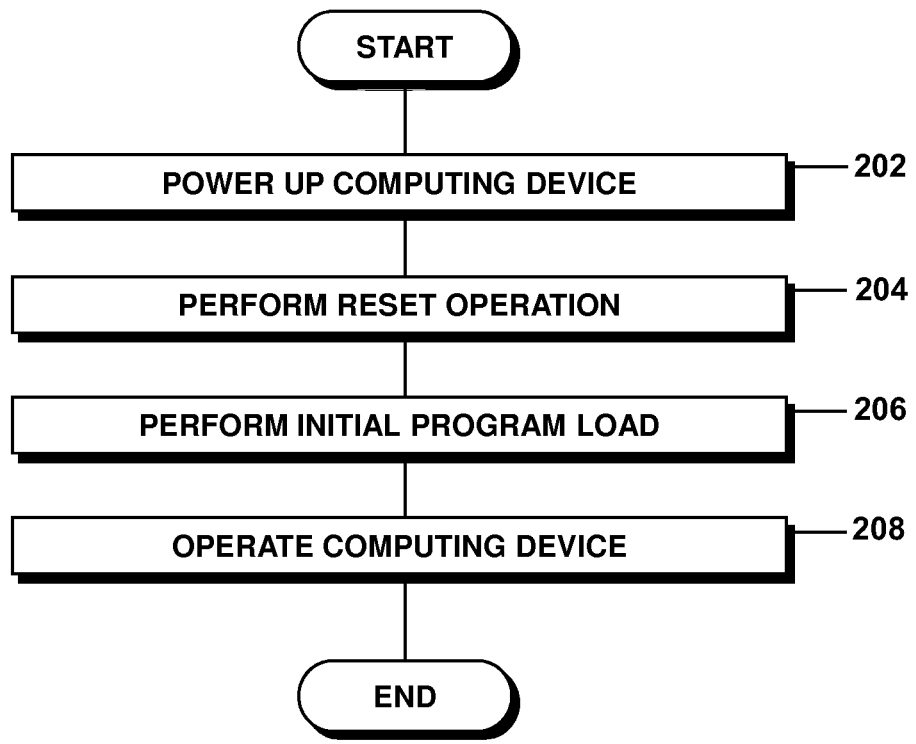
FIG. 2 is a flowchart illustrating operation of an example method for starting up the computing device in FIG. 1.

FIG. 2 is a flowchart illustrating operation of an example method 200 for starting up the computing device in FIG. 1. The flowchart in FIG. 2 is described with reference to the computing device 100 in FIG. 1 as an example implementation platform. However, any other suitable and similarly equipped hardware platform may be used as well.

In the example shown in FIG. 2, the computing device 100 is powered up at step 202 followed by a reset operation at step 204. An example reset operation at step 204 is described in more detail with reference to FIG. 3. In step 206, an initial program load is performed. An example of an initial program load is described in more detail with reference to FIG. 4. After the start-up operations at steps 204 and 206, the computing device 100 is operational and may be operated at step 208 according to its specified functions.

It is noted that the start-up procedure illustrated by the method 200 in FIG. 2 may include additional steps that may be common to start-up procedures for computing devices in a wide variety of applications. Such additional steps may include additional initialization phases, which may include steps of initializing the chip set of the computing device, which may include, for example, a northbridge and southbridge chip configuration. The additional steps may also include steps for initializing memory or other components in the system. Such procedures are known to those of ordinary skill in the art and need not be described in further detail here.

Figure 3:
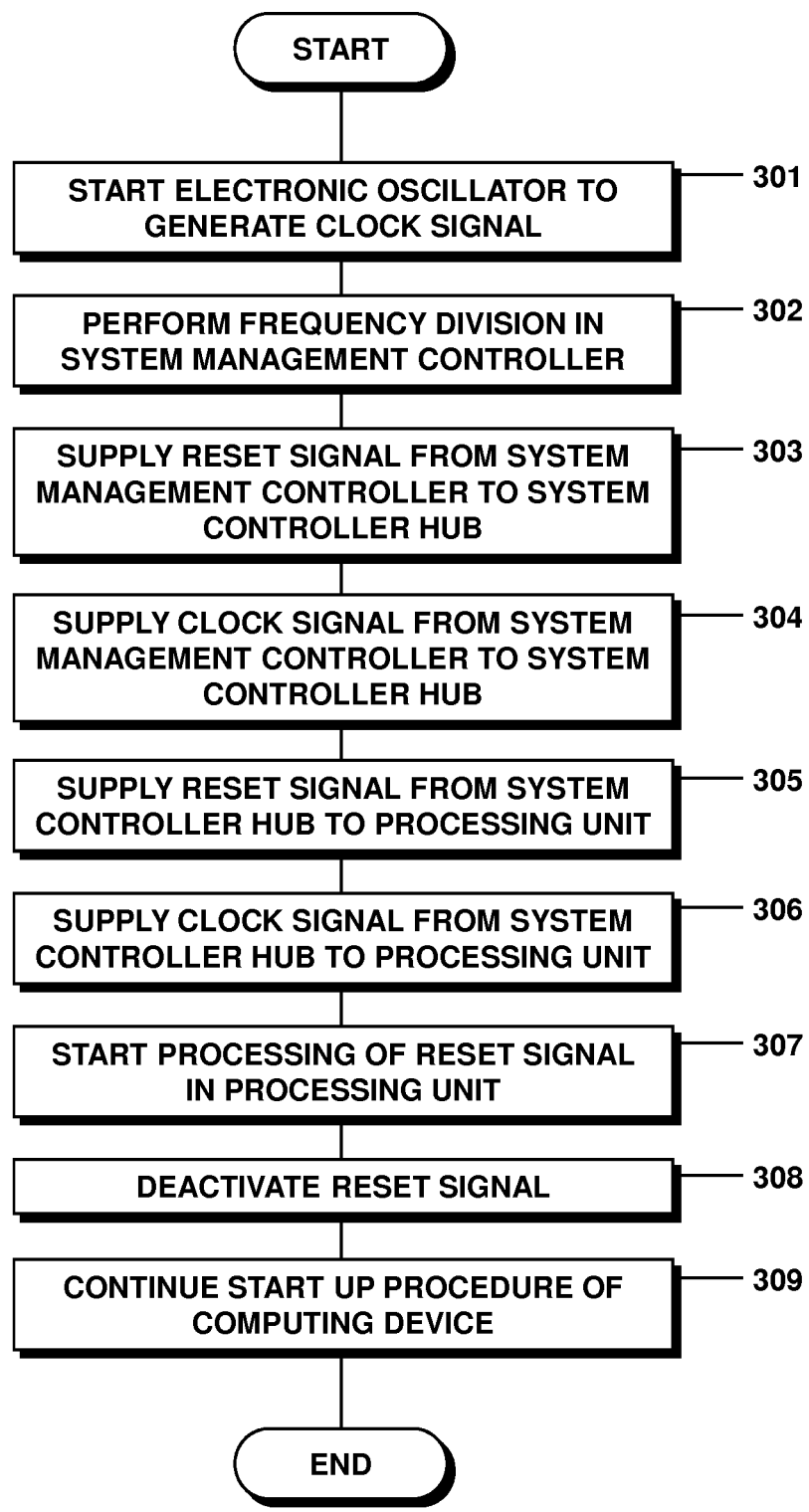
FIG. 3 is a flowchart illustrating operation of an example method for performing a reset operation in the example method shown in FIG. 2.

FIG. 3 is a flowchart illustrating operation of an example method for performing a reset operation in the example method shown in FIG. 2. At step 301, the electronic oscillator connected to the SMC 105 is started to generate a clock signal. At step 302, a frequency division may be performed in the SMC 105 to generate the clock signal with a desired frequency, which may be the frequency of operation of the SCH 103. At step 303, a reset signal is supplied from the SMC 105 to the SCH 103. At step 304, the clock signal generated by frequency division in the SMC 105 is provided to the system controller hub 103. At step 305, the SCH 103 provides the reset signal to the processing unit 102. At step 306, the SCH 103 provides the clock signal to the processing unit 102. The order of providing the reset signal and the clock signal to the SCH 103 and to the processing unit 102 may be different. For example, the order may be reversed. The signals may be supplied asynchronously. The recognition of the reset generally occurs after a certain number of clock cycles. The recognition of the reset signal may thus occur synchronously. The clock signal from the SMC 105 may be available shortly after powering up the computing device 100. Therefore, the CPU 102 may start to process the reset signal after a short delay at step 307.

At step 308, the reset signal is deactivated. In example implementations, the reset signal may be deactivated several hundred microseconds earlier than in conventional systems. At step 309, the start-up procedure of the computing device 100 is continued after the reset signal is deactivated.

Figure 4:
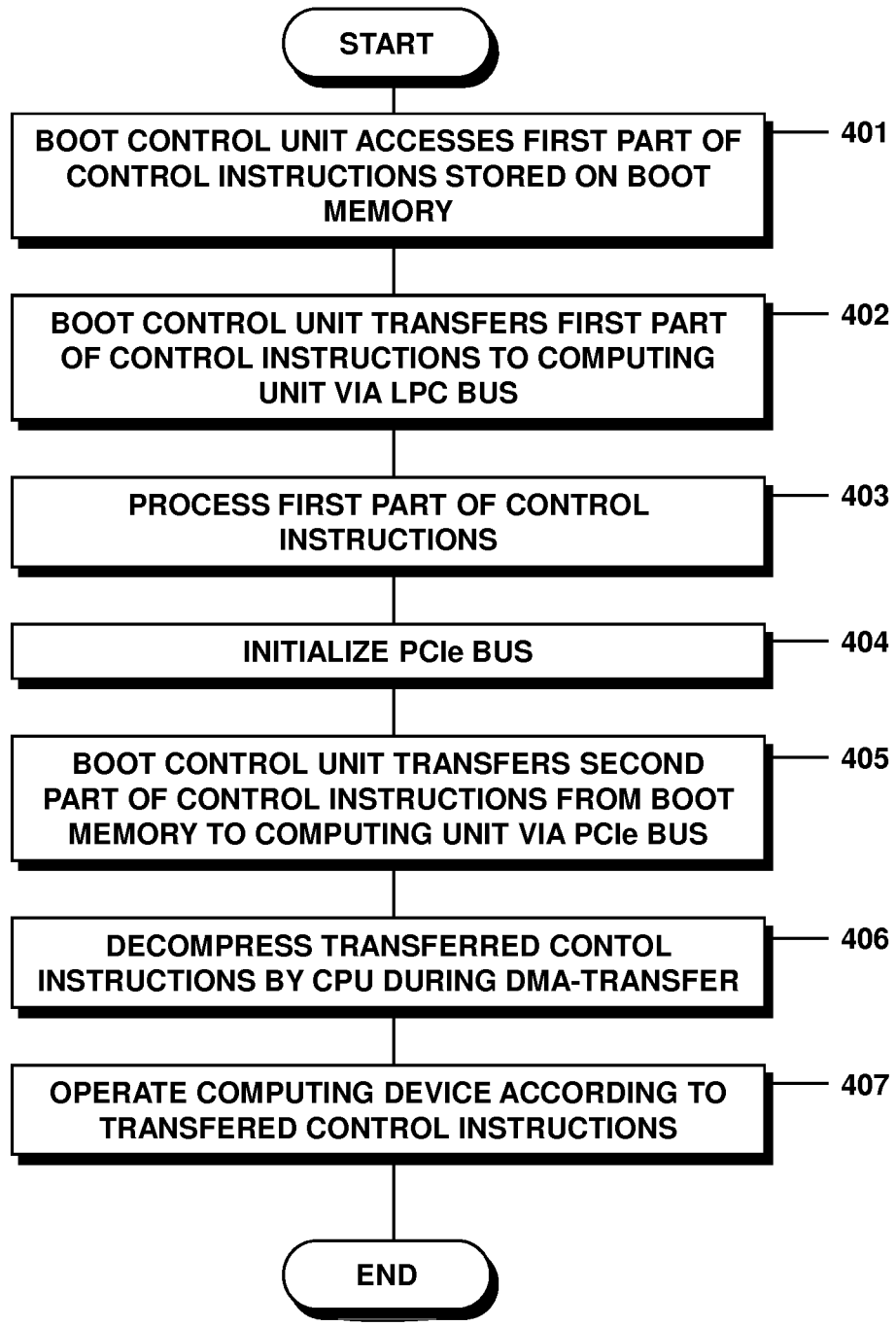
FIG. 4 is a flowchart illustrating operation of an example method for performing an initial program load in the example method shown in FIG. 2.

FIG. 4 is a flowchart illustrating operation of an example method for performing an initial program load in the example method shown in FIG. 2. At step 401, the boot control unit 108 accesses a first part of the control instructions stored on the boot memory 106. At step 402, the boot control unit 108 transfers the first part of the control instructions to the computing unit 101 via the LPC bus 107 (FIG. 1). In the example computing device 100 in FIG. 1, the instructions are transferred to the SCH 103, although other suitable controllers or units may be used to provide the LPC interface 107. The transfer may for example be performed in a bitwise manner without the need to buffer larger parts of the control instructions in the boot control unit 108. In an example implementation, the first part of the control instructions may include 100-300 kB of data. At step 403, the first part of the control instructions is processed. The processing of the first part of the control instructions may be performed for example, by the SCH 103 and the CPU 102. Execution of the first part of the control instructions initializes the PCIe bus 111 (or other suitable high-speed data interconnect) at step 104. After the initialization of the PCIe bus 111, the transfer of the boot application to memory is switched over from the slower LPC interface to the high-speed PCIe bus 111. At step 405, the boot control unit transfers the second part of the control instructions from the boot memory 106 to the computing unit 101 via the PCIe bus 111. The transfer of the second part of the control instructions may be controlled by the DMA controller 110 and may occur directly into the memory 104 of computing unit 101. If the control instructions are stored in a compressed format in boot memory 106, the CPU 102 may decompress the data during the DMA transfer at step 406. The decompression may be performed in parallel to the data transfer causing a negligible delay. At step 407, after the boot application is loaded into the memory 104, the computing device 100 operates according to the control instructions. The control instructions may for example execute as a basic operating system of the computing device 100.

The methods described with respect to FIGS. 3 and 4 may include additional steps that are commonly performed during the system reset or during the loading of the boot application. The steps may also be performed in different orders or in parallel. For example, the generating and supplying of the clock signal to the SCH in step 304 and the supplying of the reset signal to the SCH in step 305 may be performed in parallel.

It will be understood, and is appreciated by persons skilled in the art, that one or more processes, sub-processes, or process steps described in connection with FIGS. 1-4 may be performed by hardware and/or software. If the process is performed by software, the software may reside in software memory (not shown) in a suitable electronic processing component or system such as, one or more of the functional components or modules schematically depicted in FIGS. 1-4. The software in software memory may include an ordered listing of executable instructions for implementing logical functions (that is, "logic" that may be implemented either in digital form such as digital circuitry or source code), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing examples of the invention. The claims and their equivalents define the scope of the invention.

What is claimed is:

1. A computing device comprising:
   a computing unit having a working memory and a processing unit;
   a boot memory having control instructions to be transferred to the computing unit at start-up of the computing device, the control instructions configured to operate the computing device; and
   a boot control unit connected to the computing unit by a first bus and a second bus and connected to the boot memory by a third bus, the boot control unit configured to transfer a first part of the control instructions configured to initialize the second bus from the boot memory via the first bus to the computing unit and to transfer a second part of the control instructions from the boot memory via the second bus to the computing unit, where the second bus is configured to transfer data at a faster rate than the first bus.

2. The computing device of claim 1 where the second part of the control instructions is larger than the first part.

3. The computing device of claim 1 where the boot control unit includes a direct memory access controller for transferring the second part of the control instructions via the second bus into the working memory of the computing unit.

4. The computing device of claim 1 where the boot control unit includes a field-programmable gate array or an application specific integrated circuit.

5. The computing device of claim 1 where the first bus is a low pin count bus and the second bus is a peripheral component interconnect express bus.

6. The computing device of claim 1 where the computing unit includes a system controller hub having the first and the second buses, and connected to the working memory.

7. The computing device of claim 6 where the boot memory includes a flash memory, the computing unit includes an Intel® Menlow platform with the system controller hub and the processing unit is an x86-compatible microprocessor.

8. The computing device of claim 1 where the first part of the control instructions includes control instructions for initializing the second bus, the boot control unit being configured to transfer the second part of the control instructions after initialization of the second bus.

9. A method of operating a computing device having a computing unit having a working memory and a processing unit, a boot memory having control instructions for operating the computing device to be transferred to the computing unit at start-up of the computing device, and a boot control unit connected to the computing unit by at least a first bus and a second bus and to the boot memory by a third interface, the method comprising:
 retrieving the control instructions from the boot memory by the boot control unit;
 transferring a first part of the control instructions configured to initialize the second bus via the first bus to the computing unit, where the second bus is configured to transfer data at a faster rate than the first bus; and
 transferring a second part of the control instructions via the second bus to the computing unit.

10. The method of claim 9 where the control instructions are stored in a compressed format in the boot memory, the method further comprising:
 decompressing the control instructions after the compressed control instructions are received at the computing unit.

11. The method of claim 9 where the computing unit further includes a system controller hub having the first and the second bus, and connected to the working memory.

12. A computing device comprising:
 a computing unit having a working memory, a processing unit and a system controller hub connected to the memory and the processing unit;
 a boot memory having control instructions for operating the computing device to be transferred to the computing unit at start-up of the computing device; and
 a boot control unit connected to the system controller hub of the computing unit by at least a first and a second bus and connected to the boot memory by a third bus, the boot control unit configured to transfer a first part of the control instructions configured to initialize the second bus from the boot memory via the first bus to the computing unit and to transfer a second part of the control instructions from the boot memory via the second bus to the computing unit, the second bus being configured to transfer data at a faster rate than the first bus.

\* \* \* \* \*

UNITED STATES PATENT AND TRADEMARK OFFICE
CERTIFICATE OF CORRECTION

| | | |
|---|---|---|
| PATENT NO. | : 8,621,193 B2 | Page 1 of 1 |
| APPLICATION NO. | : 12/722468 | |
| DATED | : December 31, 2013 | |
| INVENTOR(S) | : Thomas Erforth et al. | |

It is certified that error appears in the above-identified patent and that said Letters Patent is hereby corrected as shown below:

In the Specification:

Column 1
Line 27, please delete "interne" and insert -- internet --

Signed and Sealed this
Eleventh Day of March, 2014

Michelle K. Lee
*Deputy Director of the United States Patent and Trademark Office*